May 12, 1970 K. Y. AWEIMRINE 3,511,450
INERTIA LOCK REEL
Filed March 11, 1968 3 Sheets-Sheet 1
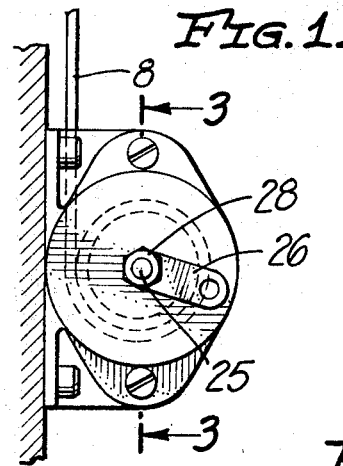
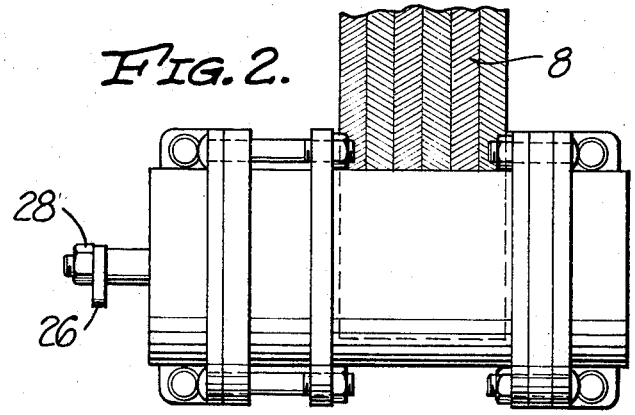
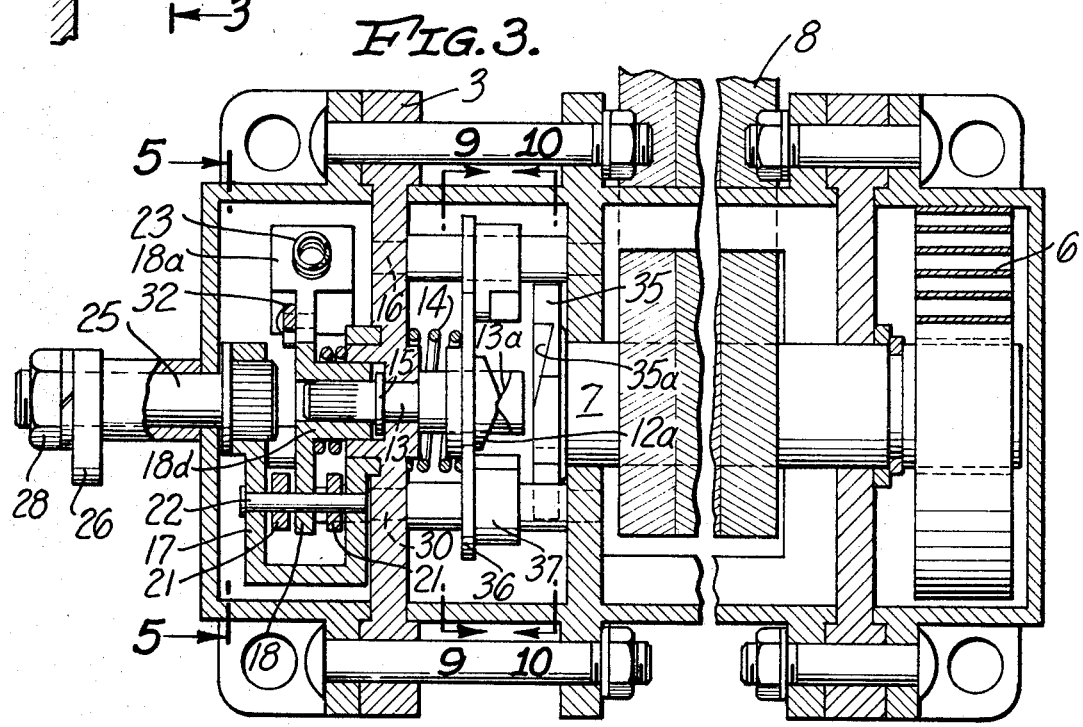
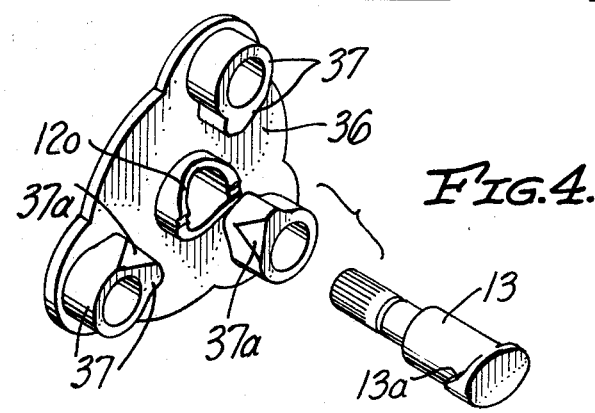
INVENTOR
KAMAL Y. AWEIMRINE
BY
Robert C. Comstock
ATTORNEY

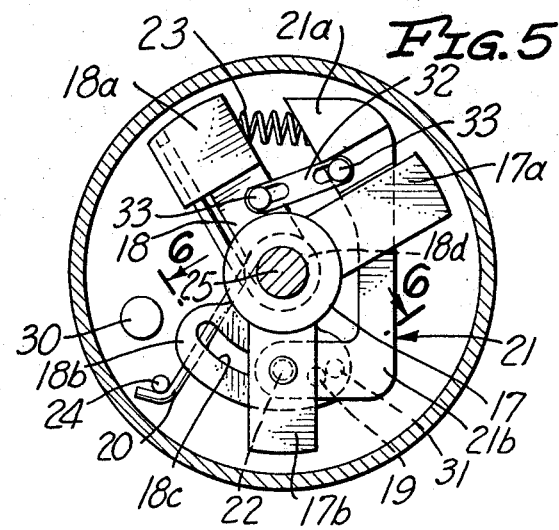
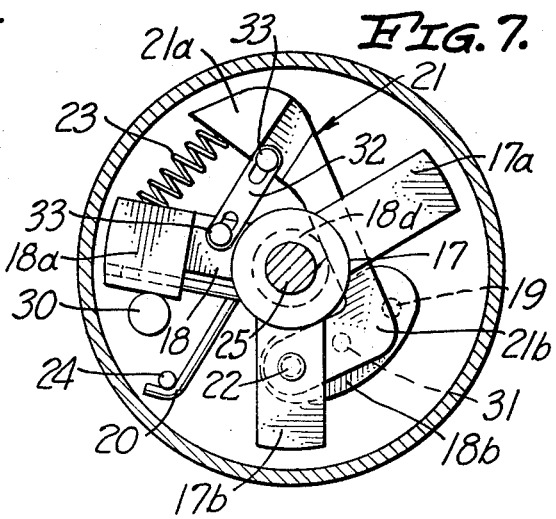
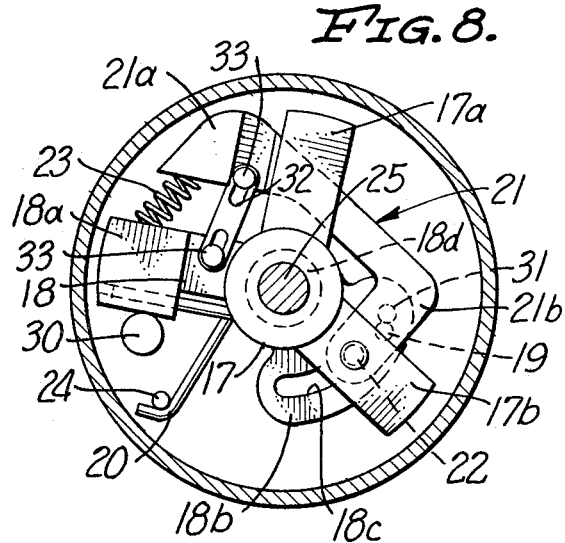
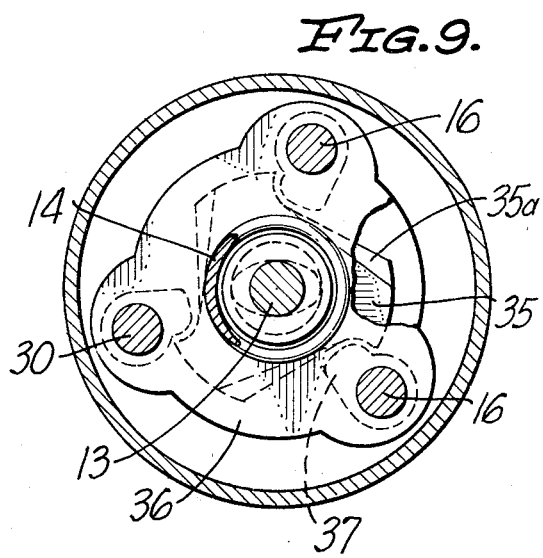
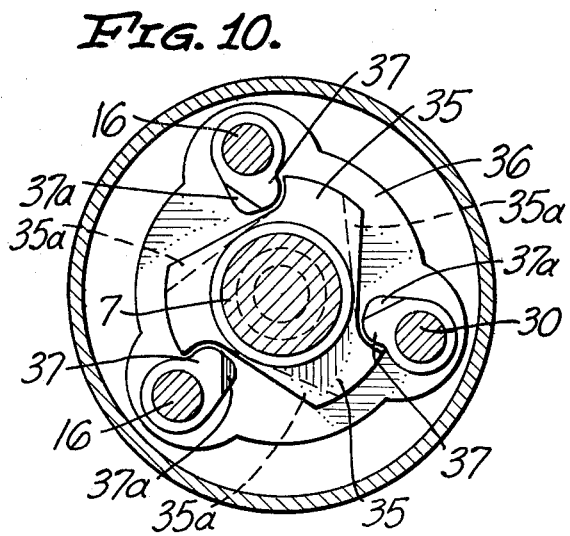
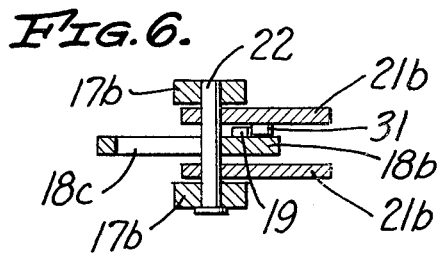

United States Patent Office 3,511,450
Patented May 12, 1970

3,511,450
INERTIA LOCK REEL
Kamal Y. Aweimrine, 4209 W. 1st St.,
Los Angeles, Calif. 90004
Filed Mar. 11, 1968, Ser. No. 712,091
Int. Cl. B65h 75/48
U.S. Cl. 242—107.4
8 Claims

ABSTRACT OF THE DISCLOSURE

An inertia lock reel for use on the safety belts or harnesses of vehicles. The locking mechanism includes rotatable members having a pair of pawls which are normally engaged. If a sudden deceleration occurs, an inertia weight member automatically rotates to move one of the pawls out of engagement with the other. This results in ratchet members being engaged to prevent unwinding of the safety belt or harness, while permitting it to be rewound.

BACKGROUND OF THE INVENTION

Field of the invention

The invention relates to an inertia lock reel for use on the safety belts or harnesses of airplanes or other vehicles.

Description of the prior art

The prior art devices have inertia locks which are a part of the regular reel locking mechanism, so that if a malfunction occurs in either part, both parts are rendered unserviceable. With this invention, the inertia locking mechanism is constructed and operates independently from the remaining locking mechanism.

Summary of the invention

The invention relates to an inertia lock reel which is particularly adapted for use in connection with the safety belts and harnesses of airplanes and other vehicles.

The inertia lock reel is a safety device designed for use in the restrain system of a vehicle seat. It may be installed on the back of the seat or on the floor adjacent to the seat. Under normal conditions the belt or harness may travel freely (within limits) by extraction or retraction from and into the reel housing. This provides the wearer with the necessary freedom of movement. The reel may be manually locked in order to prevent further extraction, while permitting retraction.

The reel may also be similarly locked automatically if subjected to a deceleration force of a predetermined magnitude. The purpose of this automatic inertia locking is to insure the safety of the wearer under emergency conditions.

It is among the objects of the invention to provide an inertia lock reel which is simple and economical to manufacture and which is simple and efficient in operation. A further object of the invention is to provide such a device which is an improvement over similar devices which are now in use.

Another object of the invention is to provide such a device which is less subject to malfunction and which is simpler to service and maintain.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

DESCRIPTION OF THE DRAWINGS

FIG. 1 is an end elevational view of my inertia lock reel in use;

FIG. 2 is a side elevational view of the same;

FIG. 3 is an enlarged longitudinal sectional view of the same;

FIG. 4 is an enlarged exploded isometric view of the second ratchet member and the cam shaft which it engages;

FIG. 5 is a sectional view of the inertia locking mechanism taken along line 5—5 of FIG. 3, showing the inertia locking mechanism in unlocked position;

FIG. 6 is a sectional view taken on line 6—6 of FIG. 5;

FIG. 7 is a view similar to FIG. 5, showing the inertia locking mechanism in inertia locked position;

FIG. 8 is a view similar to FIG. 5, showing the device in manually locked position;

FIG. 9 is a sectional view of the ratchet assembly taken on line 9—9 of FIG. 3;

FIG. 10 is a sectional view of the ratchet assembly taken on line 10—10 of FIG. 3;

DESCRIPTION OF THE PREFERRED EMBODIMENT

Figure 11:
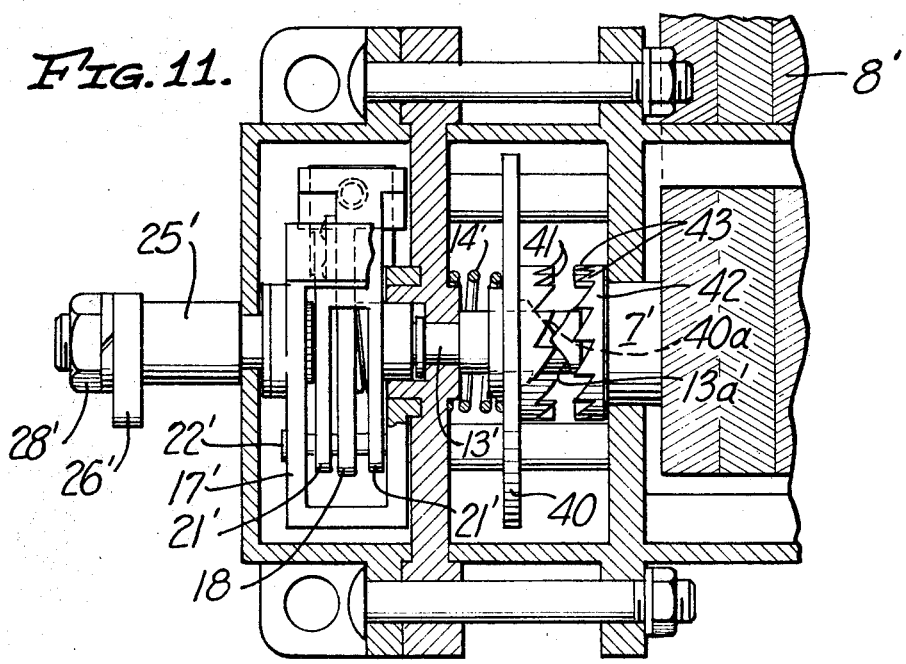
FIG. 11 is a fragmentary longitudinal sectional view similar to FIG. 3 of an alternative embodiment in which only the ratchet assembly has been changed.

A preferred embodiment which has been selected to illustrate the invention comprises a web 8, which may comprise part of a safety belt, harness or other restraint system of a vehicle. The web 8 is wound around a reel 7. A leaf spring 6 normally holds the web 8 in retracted position, but permits the web 8 to be moved outwardly by overcoming the pressure of the spring 6.

The end of the reel 7 which is adjacent to the locking mechanism carries a first ratchet member 35, which is best shown in FIG. 10 of the drawings. The first ratchet member 35 has three radially directed spokes. A complementarily formed second ratchet member 36 comprises part of the locking mechanism. The second ratchet member 36 includes three fingers 37.

The ratchet members 35 and 36 are adapted to be brought into engagement with each other by movement of the second ratchet member 36 toward the first ratchet member 35. This occurs when the locking mechanism is moved to either manual or inertia locked position, as described hereinafter in this specification.

When this occurs and the reel 7 is rotated, the fingers 37 of the second ratchet member 36 engage the spokes of the first ratchet member 35 to prevent rotation of the first ratchet member 35 in a counter-clockwise direction as shown in FIG. 10 of the drawings. This prevents the web 8 from being unwound from the reel 7.

If the reel 7 is rotated in the opposite direction, to re-wind the web 8 on the reel 7, beveled portions 35a of the spokes of the first ratchet member 35 move in a cam fashion along complementary beveled portions 37a of the fingers 37 to permit the first ratchet member 35 to rotate in a clockwise direction (as shown in FIG. 10) with respect to the second ratchet member 36.

The second ratchet member 36 is slidably mounted on one end of an elongated cam shaft 13. The outer end of the cam shaft 13 is provided with a pair of angularly directed slightly curved cam surfaces 13a. The second ratchet member 36 is provided with a centrally disposed cam bushing 12 having complementarily formed cam surfaces 12a.

A coil spring 14 surrounds the cam shaft 13 and urges the second ratchet member 36 toward the first ratchet member 35. When the locking mechanism is in unlocked position, the highest portions of the cam surfaces 12a and 13a are in engagement with each other to hold the ratchet members 35 and 36 apart, despite the urging of the coil spring 14.

The end of the cam shaft 13 remote from the cam surfaces 13a extends through the center of and is in engagement with a rotor 18, so that the shaft 13 is rotated by rotation of the rotor 18. The shaft 13 is rotatably held to a stationary support bracket 3 by a retaining ring 15.

Referring to FIGS. 5-8 of the drawings, rotor 18 includes an end portion 18a and an opposite end portion 18b, which is provided with an arcuate slot 18c. The rotor 18 also includes a central core 18d which surrounds the cam shaft 13. The rotor 18 carries a pawl 19, which extends transversely from its end portion 18b adjacent to one end of the slot 18c.

Surrounding the rotor 18 is a spider 17, which includes a pair of yoke-shaped sections 17a and 17b. The spider 17 is mounted for rotation about a longitudinal axis corresponding to that of the cam shaft 13.

A pin 22 extends through both sides of the section 17b of the spider 17 and through the slot 18c in the rotor 18. An inertia weight member 21 has a weight 21a at one end thereof, which is connected to a yoke 21b which extends around the end 18b of the rotor 18 and within the section 17b of the spider 17. The yoke 21b of the inertia weight member 21 is bent at a right angle, with the end thereof remote from the weight 21a being rotatably mounted on the pin 22. The yoke 21b carries on one side thereof a pawl 31, which is directed transversely inwardly toward the rotor 18. The pawl 31 engages the pawl 19 of the rotor 18 when the device is in "unlocked" and "manual lock" position.

A coil spring 23 extends between the end 18a of the rotor 18 and the weight 21a of the inertia weight member 21. A link 32 extends between the same two members and is provided with slots at its opposite ends through which pins 33 extend. The link 32 limits the respective movement of the parts between which it extends.

A torsion spring 20 has one end thereof in engagement with the pin 24 which is secured to the support bracket 3. The torsion spring 20 extends around the outside diameter of the central core 18d and its opposite end extends into an opening in the end 18a of the rotor 18.

A shaft 25 is connected at its inner end to the spider 17, so that rotation of the shaft 25 will cause rotation of the spider 17. A handle 26 is connected to the shaft and is adapted to be manually rotated. The handle 26 is held on the shaft 25 of a nut 28.

The handle 26 is normally disposed "unlocked" position, in which case the parts are disposed in the positions shown in FIGS. 3 and 5 of the drawings. The web 8 is free to move in both directions.

When the handle 26 is rotated to "manual lock" position, the spider 17 is rotated. Rotation of the spider 17 causes the entire locking mechanism to be rotated as a unit in a counter-clockwise direction from the position shown in FIG. 5 of the drawings to the position shown in FIG. 8 of the drawings. This rotation is limited by engagement between the end 18a of the rotor 18 and an adjacent shaft 30 which is elongated to extend into the locking mechanism area beyond the other two corresponding shafts 16. It will be noted that all parts of the locking mechanism shown in the drawings retain the same respective positions with respect to each other, and the pawls 19 and 31 remain in engagement.

Rotation of the rotor 18 causes the cam shaft 13 to be rotated, so that its cam surfaces 13a make sliding engagement with the cam surfaces 12a of the second ratchet member 36 and permit the second ratchet member 36 to be moved into engagement with the first ratchet member 35 by urging from the coil spring 14. As described earlier in the specification, the ratchet engagement between the members 35 and 36 prevents further unwinding of the web 8 from the reel 7, while permitting the web 8 to be re-wound on the reel 7.

If a sudden stopping force should be applied to the vehicle while the locking mechanism is in the "unlocked" position, the relatively heavy mass of weight 21a of the inertia weight member 21 causes it to rotate with respect to the other portions of the locking mechanism assembly. This rotation takes place in a counter-clockwise direction as shown in FIGS. 5-8 of the drawings. The inertia weight member 21 rotates or pivots about the pin 22. This pivoting action moves the pawl 31, which is carried by the portion 21b of the inertia weight member 21, radially inwardly toward the shaft 13.

As the pawl 31 is moved inwardly, it moves out of engagement with the pawl 19, leaving the pawl 19 free to be moved in a counter-clockwise direction along with the rotor 18 in response to the urging of the torsion spring 20.

This movement of the inertia weight member 21 and rotor 18 in a counter-clockwise direction continues until the end 18a of the rotor engages the stop 30 and the opposite or counter-clockwise end of the slot 18c engages the pin 22.

The parts are then disposed in the position shown in FIG. 7 of the drawings. It will be noted from FIG. 7 that while the inertia weight member 21 and rotor 18 have been rotated in a counter-clockwise direction from their positions in FIG. 7, and spider 17 has remained stationary and the shaft 25 and handle 26 accordingly remain in the "unlocked" position.

Rotation of the rotor 18 causes the cam shaft 13 to rotate the cam surfaces 13a at its opposite end to permit lateral movement of the ratchet members 35 and 36 into engagement with each other in response to the urging of the coil spring 14. The web 8 is accordingly held against unwinding from the reel 7, while it can be re-wound.

The locking mechanism can be returned to its normal position by first moving the handle 26 to "manual lock" position. When this is done, the spider 17 is rotated and as the pin 22 which is carried by the spider 17 is rotated, it pivots the inertia weight member 21 and causes its pawl 31 to be moved back into engagement with the pawl 19. The parts are then in the positions shown in FIG. 8 of the drawings.

The handle 26 is then moved back to "unlock" position, moving all of the parts of the locking mechanism simultaneously back to the positions shown in FIG. 5 of the drawings and re-engaging the pawls 19 and 31.

Figure 12:
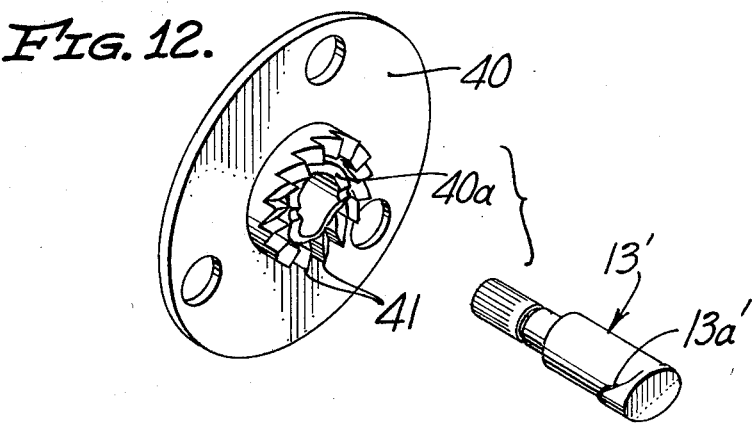
FIG. 12 is an exploded isometric view of the second ratchet member and cam shaft of FIG. 11.

FIGS. 11 and 12 of the drawings show an alternative embodiment of the invention in which all of the parts are identical except for the ratchet members. Parts corresponding to those shown in FIGS. 1-10 of the drawings have been given the same reference numerals with a prime sign added.

In the embodiment shown in FIGS. 11 and 12, a first ratchet member 42 has a plurality of teeth 43. A second ratchet member 40 has a plurality of complementary teeth 41 and a cam surface 40a which engages the cam surface 13a' on the cam shaft 13'.

When the second ratchet member 40 is moved laterally into engagement with the first ratchet member 42, the teeth 41 and 43 engage to permit rotation of the reel 7' in only one direction.

While the embodiment of the invention which is shown in the drawings has an inertia weight member which operates in only one direction, my device is also adapted for use with an inertia weight member which operates in several directions or which is multi-directional.

I claim:

1. In an inertia lock mechanism for use with a vehicle restraint device of the type having a web rotatably and retractably wound around a reel, ratchet means for locking said reel to prevent rotation thereof except in a retracting direction, inertia locking means operatively connected to said ratchet means to control the engagement thereof, said inertia locking means being operable upon the application of a deceleration force to the vehicle to engage said ratchet means and lock said reel against rotation except in a retracting direction, said inertia locking means including a pivotally mounted inertia weight member, a weight carried by said inertia weight member, said weight being adapted to pivot said inertia weight member and thereby engage said ratchet means, a pawl carried by said inertia weight member, and a second pawl engageable with said first named pawl, said pawls normally being engaged with each other, the pivotal movement of said inertia weight member moving said pawls out of engagement with each other.

2. The structure described in claim 1, and a rotatably mounted rotor connected to said ratchet means so that the rotation of said rotor controls the engagement of said ratchet means, said second pawl being carried by said rotor, the pivotal movement of said inertia weight member moving said first named pawl out of engagement with said second pawl to permit the rotation of said rotor to engage said ratchet means.

3. The structure described in claim 2, and resilient means normally urging said rotor toward a ratchet engaging position, the engagement between said pawls holding said rotor against rotation in response to the urging of said resilient means.

4. The structure described in claim 3, said ratchet means including a first ratchet member attached to said reel, a second ratchet member adapted to engage said first ratchet member to permit the rotation of said reel in only a retracting direction, a rotatable cam shaft having a cam surface, said second ratchet member having a cam surface engaging the cam surface of said cam shaft, resilient means normally urging said second ratchet member toward said first ratchet member, the rotation of said cam shaft controlling the movement of said second ratchet member through said cam surfaces, said rotor being connected to said cam shaft so that rotation of said rotor results in rotation of said cam shaft.

5. The structure described in claim 4, and a spider mounted for rotation about the axis of said cam shaft, a pin connected to said spider, the end of said inertia weight member remote from said weight being pivotally mounted on said pin, and control means connected to said spider for rotating said spider in two directions, and through said spider rotating said cam shaft, rotor and inertia weight member simultaneously to selectively engage and disengage said ratchet members without disengaging said pawls.

6. The structure described in claim 5, and an arcuate slot extending through said rotor adjacent to said second pawl, said pin extending through said slot, and resilient means urging said rotor and cam shaft in a ratchet engaging direction, said pin being disposed toward the end of said slot adjacent to said second pawl when said pawls are in engagement with each other, said resilient means rotating said rotor to move said pin to the opposite end of said slot when said pawls are disengaged.

7. The structure described in claim 6, said cam shaft being rotatable in the reverse direction against the urging of said resilient means to disengage said ratchet means, said reverse rotation of said cam shaft rotating said rotor to move said pin to the opposite end of said slot, the movement of said pin along said slot pivoting said inertia weight member to move said pawls back into engagement with each other.

8. The structure described in claim 7, and resilient means extending between said weight and the adjacent portion of said rotor, said resilient means normally urging said weight and the adjacent portion of said rotor away from each other to hold said inertia weight member against pivotal movement except in response to said deceleration force, said deceleration force overcoming the force of said resilient means.

References Cited

UNITED STATES PATENTS

| | | | |
|---|---|---|---|
| 2,650,655 | 9/1953 | Neahr et al. | 242—107.4 XR |
| 2,899,146 | 8/1959 | Barecki | 242—107.4 |
| 3,226,053 | 12/1965 | Petty | 242—107.4 |
| 3,347,488 | 10/1967 | Quinting | 242—107.4 |

STANLEY N. GILREATH, Primary Examiner

W. H. SCHROEDER, Assistant Examiner